(12) United States Patent
Otsubo

(10) Patent No.: US 10,533,706 B2
(45) Date of Patent: Jan. 14, 2020

(54) FUEL CELL SYSTEM AND CONTROL METHOD FOR FUEL CELL SYSTEM

(71) Applicant: TOYOTA JIDOSHA KABUSHIKI KAISHA, Toyota-shi, Aichi-ken (JP)

(72) Inventor: Hirokazu Otsubo, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/276,760

(22) Filed: Feb. 15, 2019

(65) Prior Publication Data
US 2019/0264871 A1 Aug. 29, 2019

(30) Foreign Application Priority Data
Feb. 26, 2018 (JP) .................................. 2018-031780

(51) Int. Cl.
*F17C 1/02* (2006.01)
*H01M 8/04082* (2016.01)
*F17C 1/16* (2006.01)

(52) U.S. Cl.
CPC .................. *F17C 1/02* (2013.01); *F17C 1/16* (2013.01); *H01M 8/04201* (2013.01); *F17C 2201/0104* (2013.01); *F17C 2201/0109* (2013.01); *F17C 2201/054* (2013.01); *F17C 2201/056* (2013.01); *F17C 2203/012* (2013.01); *F17C 2203/0604* (2013.01); *F17C 2203/0619* (2013.01); *F17C 2203/0663* (2013.01); *F17C 2203/0673* (2013.01); *F17C 2205/013* (2013.01); *F17C 2205/0305* (2013.01); *F17C 2205/0397* (2013.01); *F17C 2209/232* (2013.01); *F17C 2221/012* (2013.01); *F17C 2223/0123* (2013.01); *F17C 2223/036* (2013.01);

(Continued)

(58) Field of Classification Search
CPC .......... F17C 1/02; F17C 1/16; H01M 8/04201
USPC ...................................................... 340/612
See application file for complete search history.

(56) References Cited

U.S. PATENT DOCUMENTS

2004/0173618 A1* 9/2004 Suzuki .................. F17C 1/16 220/581
2010/0001851 A1* 1/2010 Handa .................. F17C 1/16 340/438

(Continued)

FOREIGN PATENT DOCUMENTS

JP 2006-226511 A 8/2006
JP 2011-137545 A 7/2011

*Primary Examiner* — Kerri L McNally
(74) *Attorney, Agent, or Firm* — Dickinson Wright, PLLC

(57) ABSTRACT

A fuel cell system includes: a high-pressure tank including a resin liner and a reinforcing layer; an acquisition portion configured to acquire a value of an internal pressure and a value of an internal temperature of the high-pressure tank; a notification portion; and a controlling portion. The controlling portion sets, in a map of the internal temperature and the internal pressure, a boundary line sectioning the map into a first region and a second region, the first region indicating a possibility that a stress caused in the resin liner damages the resin liner, the second region being a region having a higher temperature and a higher pressure than the first region. When the value of the internal temperature and the value of the internal pressure reach the boundary line, the controlling portion causes the notification portion to notify that the high-pressure tank needs to be filled with a fuel gas.

10 Claims, 7 Drawing Sheets

(52) U.S. Cl.
CPC .. *F17C 2227/046* (2013.01); *F17C 2227/048* (2013.01); *F17C 2250/032* (2013.01); *F17C 2250/043* (2013.01); *F17C 2250/0439* (2013.01); *F17C 2250/0631* (2013.01); *F17C 2250/077* (2013.01); *F17C 2260/011* (2013.01); *F17C 2265/066* (2013.01); *F17C 2270/01* (2013.01); *F17C 2270/0178* (2013.01); *F17C 2270/0184* (2013.01); *F17C 2270/0189* (2013.01)

(56) References Cited

U.S. PATENT DOCUMENTS

| | | | |
|---|---|---|---|
| 2011/0227742 A1* | 9/2011 | Yang | G01F 9/001 |
| | | | 340/614 |
| 2013/0052557 A1* | 2/2013 | Okawachi | F17C 1/06 |
| | | | 429/444 |
| 2018/0163925 A1* | 6/2018 | Inoh | B32B 1/02 |
| 2018/0283309 A1* | 10/2018 | Kamat | B22D 19/0009 |
| 2018/0340655 A1* | 11/2018 | Lee | F17C 1/16 |

\* cited by examiner

FUEL CELL SYSTEM AND CONTROL METHOD FOR FUEL CELL SYSTEM

INCORPORATION BY REFERENCE

The disclosure of Japanese Patent Application No. 2018-031780 filed on Feb. 26, 2018 including the specification, drawings and abstract is incorporated herein by reference in its entirety.

BACKGROUND

1. Technical Field

This disclosure relates to a fuel cell system and a control method for a fuel cell system.

2. Description of Related Art

There has been conventionally known a method for detecting a residual amount in a high-pressure hydrogen tank such that a hydrogen residual amount is estimated from a pressure inside the high-pressure hydrogen tank (e.g., Japanese Unexamined Patent Application Publication No. 2011-137545 (JP 2011-137545 A)).

SUMMARY

In a case where a tank including a resin liner and a reinforcing layer formed around the resin liner is used as a high-pressure hydrogen tank, it is known that the resin liner expands or contracts due to a change in an operating environment such as a temperature of the tank or an internal pressure of the tank. The inventors of the present application found that, when an extremely contracted state of the resin liner and an extremely expanded state of the resin liner are repeated, an excessive stress is caused in the resin liner, so that the resin liner might be damaged.

This disclosure is achievable in the following aspects.

(1) A first aspect of this disclosure provides a fuel cell system. The fuel cell system includes a fuel cell stack, a high-pressure tank, an acquisition portion, a notification portion, and a controlling portion. The fuel cell stack is configured to generate electric power by consuming a fuel gas. The high-pressure tank includes a resin liner and a reinforcing layer configured to cover an outer surface of the resin liner. The high-pressure tank is filled with the fuel gas. The acquisition portion is configured to acquire a value of an internal pressure of the high-pressure tank and a value of an internal temperature that is a temperature inside the high-pressure tank. The notification portion is configured to notify that the high-pressure tank needs to be filled with the fuel gas. The controlling portion is configured to control an operation of the notification portion by use of the value of the internal temperature and the value of the internal pressure. The controlling portion sets, in a map of the internal temperature and the internal pressure, a boundary line sectioning the map into a first region and a second region. The first region indicates a possibility that a stress caused in the resin liner due to contraction of the resin liner damages the resin liner. The second region has a higher temperature and a higher pressure than the first region. When the value of the internal temperature and the value of the internal pressure reach the boundary line, the controlling portion causes the notification portion to notify that the high-pressure tank needs to be filled with the fuel gas. In the fuel cell system of this aspect, when the internal temperature and the internal pressure decrease and reach the boundary line, the controlling portion causes the notification portion to notify that the high-pressure tank needs to be filled with the fuel gas. This makes it possible to reduce the possibility that the resin liner is damaged due to a difference in contraction amount between the resin liner and the reinforcing layer. Here, that "the internal temperature and the internal pressure reach the boundary line" indicates that, in the map of the internal temperature and the internal pressure, a point formed by the value of the internal temperature and the value of the internal pressure reaches the boundary line, concretely, the point corresponds with one of points forming the boundary line or one of points falling within a side of the first region from the boundary line.

(2) In the fuel cell system of the above aspect, when the value of the internal pressure reaches a predetermined threshold, the controlling portion may cause the notification portion to notify that the high-pressure tank needs to be filled with the fuel gas, regardless of whether the value of the internal temperature and the value of the internal pressure reach the boundary line or not. In the fuel cell system of this aspect, when an internal pressure condition is satisfied, the notification is executed regardless of whether the internal temperature and the internal pressure reach the boundary line or not. This makes it possible to restrain such a situation that the internal pressure largely decreases from the predetermined threshold. On this account, it is possible to reduce the possibility that electric power cannot be generated by the fuel cell stack due to insufficiency of the fuel gas.

(3) In the fuel cell system of the above aspect, the resin liner may include a bonded part provided in a central part of the resin liner in the longitudinal direction of the resin liner so as to be bonded to the reinforcing layer. The stress may be caused in the resin liner at the bonded part due to contraction of the resin liner. With the fuel cell system of this aspect, it is possible to reduce the possibility that the resin liner is damaged by the stress caused in the bonded part due to contraction of the resin liner.

(4) In the fuel cell system of the above aspect, the acquisition portion may include any one of the following (i) to (iii): (i) a pressure sensor configured to acquire the value of the internal pressure and a temperature sensor configured to acquire the value of the internal temperature; (ii) the pressure sensor configured to acquire the value of the internal pressure and a temperature estimating portion configured to estimate the value of the internal temperature by use of the value of the internal pressure; and (iii) the temperature sensor configured to acquire the value of the internal temperature and a pressure estimating portion configured to estimate the value of the internal pressure by use of the value of the internal temperature. With the fuel cell system of this aspect, it is possible to provide a fuel cell system provided with the acquisition portion including any one of (i) to (iii) described above.

(5) In the fuel cell system of the above aspect, the high-pressure tank may be constituted by a plurality of high-pressure tanks. When the value of the internal temperature and the value of the internal pressure of at least one of the high-pressure tanks reach the boundary line, the controlling portion may cause the notification portion to notify that the at least one of the high-pressure tanks needs to be filled with the fuel gas.

(6) In the fuel cell system of the above aspect, when respective value of the internal pressures of the high-pressure tanks reach the predetermined threshold, the controlling portion may cause the notification portion to notify that the at least one of the high-pressure tanks needs to be filled with the fuel gas, regardless of whether the value of the internal temperature and the value of the internal pressure reach the boundary line or not.

(7) In the fuel cell system of the above aspect, the high-pressure tanks may be connected to the fuel cell stack via a fuel gas supply passage. The fuel gas supply passage may be provided with opening and closing valves. The controlling portion may control the opening and closing valves at a time of power generation of the fuel cell stack such that the high-pressure tanks have the same internal pressure.

(8) In the fuel cell system of the above aspect, the high-pressure tanks may be connected to the fuel cell stack via a fuel gas supply passage. The fuel gas supply passage may be provided with opening and closing valves. At a time of power generation of the fuel cell stack, the controlling portion may control the opening and closing valves such that the internal pressure of a second high-pressure tank out of the high-pressure tanks does not decrease until the internal pressure of a first high-pressure tank out of the high-pressure tanks decreases to a predetermined pressure value. When the value of the internal pressure and the value of the internal temperature of the second high-pressure tank reach the boundary line, the controlling portion causes the notification portion to notify that at least the second high-pressure tank needs to be filled with the fuel gas.

(9) In the fuel cell system of the above aspect, when the value of the internal pressure of the second high-pressure tank reaches the predetermined threshold, the controlling portion may cause the notification portion to notify that at least the second high-pressure tank needs to be filled with the fuel gas, regardless of whether the value of the internal temperature and the value of the internal pressure reach the boundary line or not.

(10) A second aspect of this disclosure provides a control method for a fuel cell system. The control method includes: acquiring a value of an internal pressure of a high-pressure tank and a value of an internal temperature that is a temperature inside the high-pressure tank, the high-pressure tank including a resin liner and a reinforcing layer configured to cover an outer surface of the resin liner, the high-pressure tank being filled with a fuel gas to be consumed for power generation by a fuel cell stack; setting, in a map of the internal temperature and the internal pressure, a boundary line sectioning the map into a first region and a second region, the first region indicating a possibility that a stress caused in the resin liner due to contraction of the resin liner damages the resin liner, the second region being a region having a higher temperature and a higher pressure than the first region; and causing a notification portion to notify that the high-pressure tank needs to be filled with the fuel gas, when the value of the internal temperature and the value of the internal pressure reach the boundary line.

This disclosure is achievable in various aspects other than the fuel cell system described above. For example, this disclosure is achievable in the form of the control method for the fuel cell system, a movable body such as a fuel cell vehicle, a vessel, or an airplane including the fuel cell system, or a fixed facility such as a house or a building including the fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
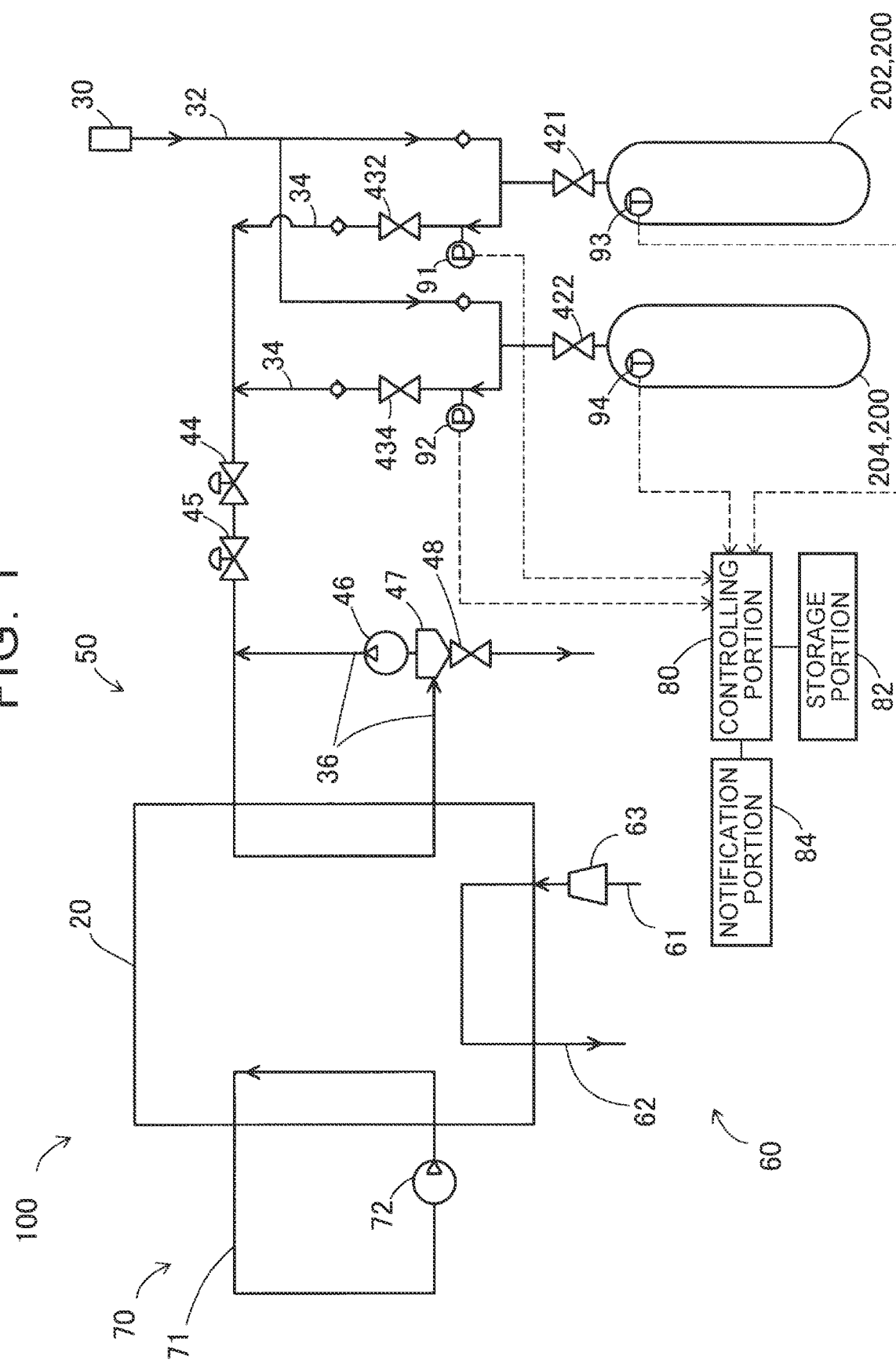
FIG. 1 is a diagrammatic view of a fuel cell system according to a first embodiment.

FIG. 1 is a diagrammatic view of a fuel cell system 100 according to the first embodiment. The fuel cell system 100 includes a fuel cell stack 20, a fuel gas supply/discharge mechanism 50, an oxidant gas supply/discharge mechanism 60, a refrigerant circulation mechanism 70, a controlling portion 80, a storage portion 82, and a notification portion 84. The fuel cell system 100 generates electric power by a reaction between a fuel gas (anode gas) and an oxidant gas (cathode gas). In the present embodiment, the fuel gas is hydrogen gas, and the oxidant gas is air.

The refrigerant circulation mechanism 70 is connected to the fuel cell stack 20 and includes a refrigerant circulation passage 71 through which a refrigerant (e.g., water) circulates and a pump 72 configured to send out the refrigerant. The oxidant gas supply/discharge mechanism 60 includes an oxidant gas supply passage 61 through which the oxidant gas is supplied to the fuel cell stack 20, and an oxidant gas discharge passage 62 through which the oxidant gas is discharged to outside. An air compressor 63 configured to pump the oxidant gas is placed inside the oxidant gas supply passage 61. The oxidant gas supply/discharge mechanism 60 supplies the air to the fuel cell stack 20 and discharges the air from the fuel cell stack 20. In the present embodiment, the fuel cell system 100 is provided in a fuel cell vehicle and is used as a power generator for driving a driving motor.

The fuel cell stack 20 has a stack structure in which a plurality of fuel-cell single cells (not shown) is laminated. In the present embodiment, the fuel-cell single cell constituting the fuel cell stack 20 is a solid polymer fuel cell configured to generate electric power by an electrochemical reaction between oxygen and hydrogen. The fuel cell stack 20 is adjusted to an appropriate temperature by the refrigerant circulation mechanism 70.

The fuel gas supply/discharge mechanism 50 includes a fuel gas filling passage 32, a fuel gas supply passage 34, a fuel gas circulation passage 36, and two high-pressure tanks 202, 204. The high-pressure tanks 202, 204 are tanks in which the fuel gas is stored and are connected to the fuel gas filling passage 32 and the fuel gas supply passage 34 via main stop valves 421, 422 that are opening and closing valves. The high-pressure tanks 202, 204 supply fuel gases stored therein to the fuel cell stack 20 via the fuel gas supply passage 34. Temperature sensors 93, 94 are provided inside the high-pressure tanks 202, 204 as an acquisition portion configured to acquire values of internal temperatures that are temperatures inside the high-pressure tanks 202, 204. In the following description, when a common property or structure of the two high-pressure tanks 202, 204 are described, they are also referred to as a high-pressure tank 200.

The fuel gas filling passage 32 is a passage communicating with the high-pressure tanks 202, 204 and is configured such that a fuel gas filled from a fuel gas filling device such as a hydrogen station circulates through the fuel gas filling passage 32. One end of the fuel gas filling passage 32 is provided with a receptacle 30 functioning as a connection opening at the time when the fuel gas filling passage 32 is connected to the fuel gas filling device.

The fuel gas supply passage 34 is a passage through which the fuel gases filled in the high-pressure tanks 202, 204 are supplied to the fuel cell stack 20. The fuel gas supply passage 34 is provided with opening and closing valves 432, 434, a regulator 44, and an injector 45. Further, the fuel gas circulation passage 36 is connected in the middle of the fuel gas supply passage 34.

The fuel gas supply passage 34 is provided with pressure sensors 91, 92 as the acquisition portion such that the pressure sensor 91 is placed between the opening and closing valve 432 and the high-pressure tank 202 and the pressure sensor 92 is placed between the opening and closing valve 434 and the high-pressure tank 204. At the position where the pressure sensor 91, 92 is placed, a constituent such as a pressure regulating valve that changes a pressure is not placed between the high-pressure tank 202, 204 and the pressure sensor 91, 92. On this account, a value of a pressure obtained by the pressure sensor 91, 92 is about the same as a value of an internal pressure of the high-pressure tank 202, 204.

The fuel gas circulation passage 36 is a passage through which an unreacted fuel gas passing through the fuel cell stack 20 is collected and supplied again to the fuel cell stack 20. In the middle of the fuel gas circulation passage 36, a hydrogen pump 46 configured to circulate the fuel gas and a gas/liquid separator 47 configured to separate the fuel gas from liquid water included in the fuel gas are placed. The liquid water included in the fuel gas is generated water that is generated by an electrochemical reaction in the fuel cell stack 20. The liquid water separated by the gas/liquid separator 47 is discharged to outside by opening an opening and closing valve 48.

In the present embodiment, the fuel gases in the two high-pressure tanks 202, 204 are adjusted to be consumed so that the internal pressures of the high-pressure tanks 202, 204 become the same. Here, that "the internal pressures are the same" indicates that the internal pressures of the high-pressure tanks 202, 204 have the same value, or that the internal pressures of the high-pressure tanks 202, 204 fall within a predetermined allowable range in which the internal pressures are considered to be the same. In this case, respective decrease rates of the fuel gases in the high-pressure tanks 202, 204 are reduced in comparison with a case where the fuel gas is consumed from only one high-pressure tank. This restrains sudden decreases of the internal temperatures of the high-pressure tanks 202, 204 due to adiabatic expansion of the fuel gases in the high-pressure tanks 202, 204.

The controlling portion 80 includes a central processing unit (CPU) and controls the operation of the notification portion 84 by use of information acquired by various sensors 91 to 94 and information stored in the storage portion 82. Details of the control of the notification portion 84 by the controlling portion 80 will be described later.

The storage portion 82 includes a storage medium such as an HDD. Various programs used when the control is executed by the controlling portion 80 and the information acquired by the various sensors 91 to 94 are stored in the storage portion 82.

In response to an instruction from the controlling portion 80, the notification portion 84 notifies a user of the fuel cell system 100 that the high-pressure tank 200 needs to be filled with the fuel gas. In the present embodiment, the user of the fuel cell system 100 is an occupant of a fuel cell vehicle equipped with the fuel cell system 100. The notification portion 84 executes the notification, for example, by sounding an alarm, playing audio, displaying an image, or lightening a light source.

Figure 2:
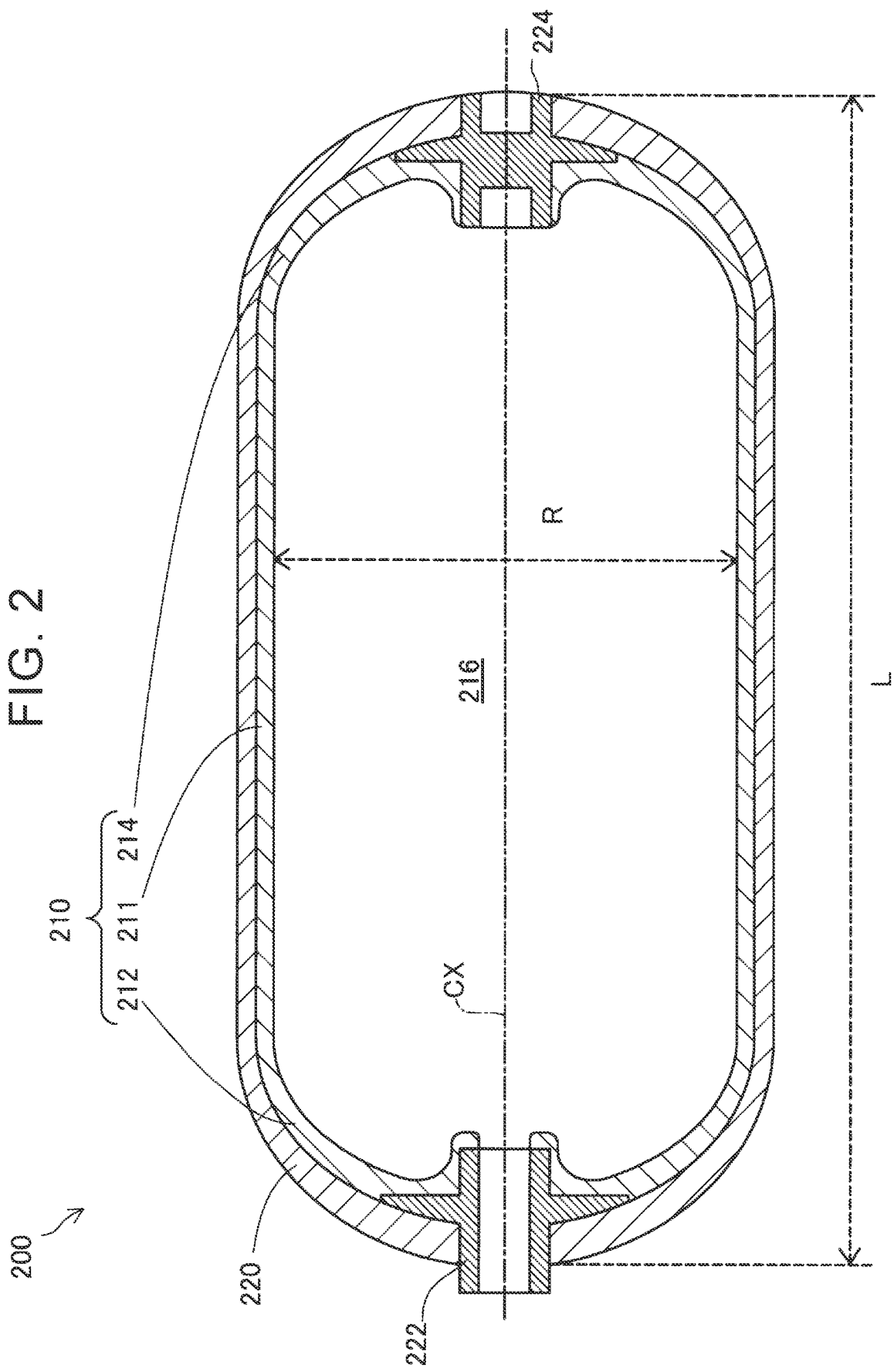
FIG. 2 is a schematic view of a high-pressure tank according to the first embodiment.

FIG. 2 is a schematic view of the high-pressure tank 200 according to the first embodiment. FIG. 2 illustrates a sectional structure obtained when the high-pressure tank 200 is cut along a central axis CX of the high-pressure tank 200. The high-pressure tank 200 includes a resin liner 210 and a reinforcing layer 220. A first mouth piece 222 and a second mouth piece 224 are attached to the opposite ends of the high-pressure tank 200 in its longitudinal direction (a direction along the central axis CX). The first mouth piece 222 has a penetration opening via which the internal space of the high-pressure tank 200 communicates with its outside. The filling of the high-pressure tank 200 with the fuel gas and the supply of the fuel gas from the high-pressure tank 200 to the fuel cell stack 20 are performed through the penetration opening of the first mouth piece 222. The second mouth piece 224 does not have a penetration opening and is used for heat exchange between the internal space of the high-pressure tank 200 and its outside, for example.

The resin liner 210 includes a cylindrical portion 211 having a cylindrical shape and hemispheric dome portions 212, 214 placed at the opposite ends of the cylindrical portion 211. The resin liner 210 is a hollow container having an internal space 216 that is a space to be filled with gas. The resin liner 210 is used as a tank element assembly of the high-pressure tank 200. Resin having low permeability with respect to the fuel gas (hydrogen gas) is used for the resin liner 210. As the resin for forming the resin liner 210, polyamide 6, ethylene vinyl alcohol, or completely saponified polyvinyl alcohol can be used, for example. In the present embodiment, the resin liner 210 is constituted by a synthetic resin mainly containing polyamide 6.

The reinforcing layer 220 is a fiber reinforced resin layer obtained such that fibers are impregnated with thermosetting resin, and the reinforcing layer 220 is formed so as to cover an outer surface of the resin liner 210. In the present embodiment, a mold releasing agent (not shown) is applied to a whole boundary surface between the resin liner 210 and the reinforcing layer 220. The fiber reinforced resin layer includes a carbon fiber reinforced resin layer including carbon fibers and thermosetting resin, and a glass fiber reinforced resin layer including glass fibers and thermosetting resin. As the thermosetting resin, epoxy resin or unsaturated polyester resin can be used, for example. In the present embodiment, epoxy resin is employed.

The resin liner 210 contracts or expands in accordance with changes in the internal temperature and the internal pressure. For example, in a case where the internal temperature is low, the resin liner 210 contracts in comparison with a case where the internal temperature is high. This is because the resin liner 210 contracts in accordance with a linear expansion coefficient of the resin constituting the resin liner 210 due to a low internal temperature. Also, for example, in a case where the internal pressure is small, the resin liner 210 contracts in comparison with a case where the internal pressure is large. Further, the viscosity of the resin constituting the resin liner 210 increases as the internal temperature decreases. In view of this, when the same internal pressure is applied, an expansion degree of the resin liner 210 is smaller in the case where the internal temperature is low than in the case where the internal temperature is high.

In the meantime, in a case where the internal temperature or the internal pressure changes, a contraction degree or an expansion degree of the reinforcing layer 220 is smaller than a contraction degree or an expansion degree of the resin liner 210. This is because a linear expansion coefficient of the resin constituting the reinforcing layer 220 is smaller than the linear expansion coefficient of the resin constituting the resin liner 210. Further, since the reinforcing layer 220 has a larger Young's modulus than the resin liner 210, the contraction degree or the expansion degree of the reinforcing layer 220 is smaller than the contraction degree or the expansion degree of the resin liner 210 in the case where the internal pressure changes.

As a result, the resin liner 210 largely contracts in a case where the internal temperature is low and the internal pressure is small. In the meantime, even in a case where the internal temperature is low and the internal pressure is small, the contraction degree of the reinforcing layer 220 is smaller than the contraction degree of the resin liner 210. On this account, in the case where the internal temperature is low and the internal pressure is small, a gap might be formed between the resin liner 210 and the reinforcing layer 220 due to a difference in contraction amount between the resin liner 210 and the reinforcing layer 220. In a boundary between the resin liner 210 and the reinforcing layer 220, the gap is easily formed in a boundary between the dome portion 212, 214 and the reinforcing layer 220. In a region where the gap is formed between the resin liner 210 and the reinforcing layer 220, a pulling stress caused due to the internal pressure of the resin liner 210 occurs. For example, in a case where the gap is formed at the time when the fuel gas is filled into the high-pressure tank 200, a large stress might occur in the resin liner 210. Note that, as the gap formed between the resin liner 210 and the reinforcing layer 220 is larger, the stress caused in the resin liner 210 at the time of filling the fuel gas tends to increase.

The gap between the resin liner 210 and the reinforcing layer 220 is easily formed as a length L of the high-pressure tank 200 in the longitudinal direction is larger. More specifically, as the length L of the high-pressure tank 200 in the longitudinal direction is larger, the internal temperature at which the gap starts to be formed between the resin liner 210 and the reinforcing layer 220 becomes higher. Further, as the length L of the high-pressure tank 200 in the longitudinal direction is larger, the internal pressure at which the gap starts to be formed between the resin liner 210 and the reinforcing layer 220 becomes larger. Further, as a diameter R of the cylindrical portion 211, on a plane perpendicular to the central axis CX, is smaller, the internal pressure at which the gap starts to be formed between the resin liner 210 and the reinforcing layer 220 becomes larger.

Figure 3:
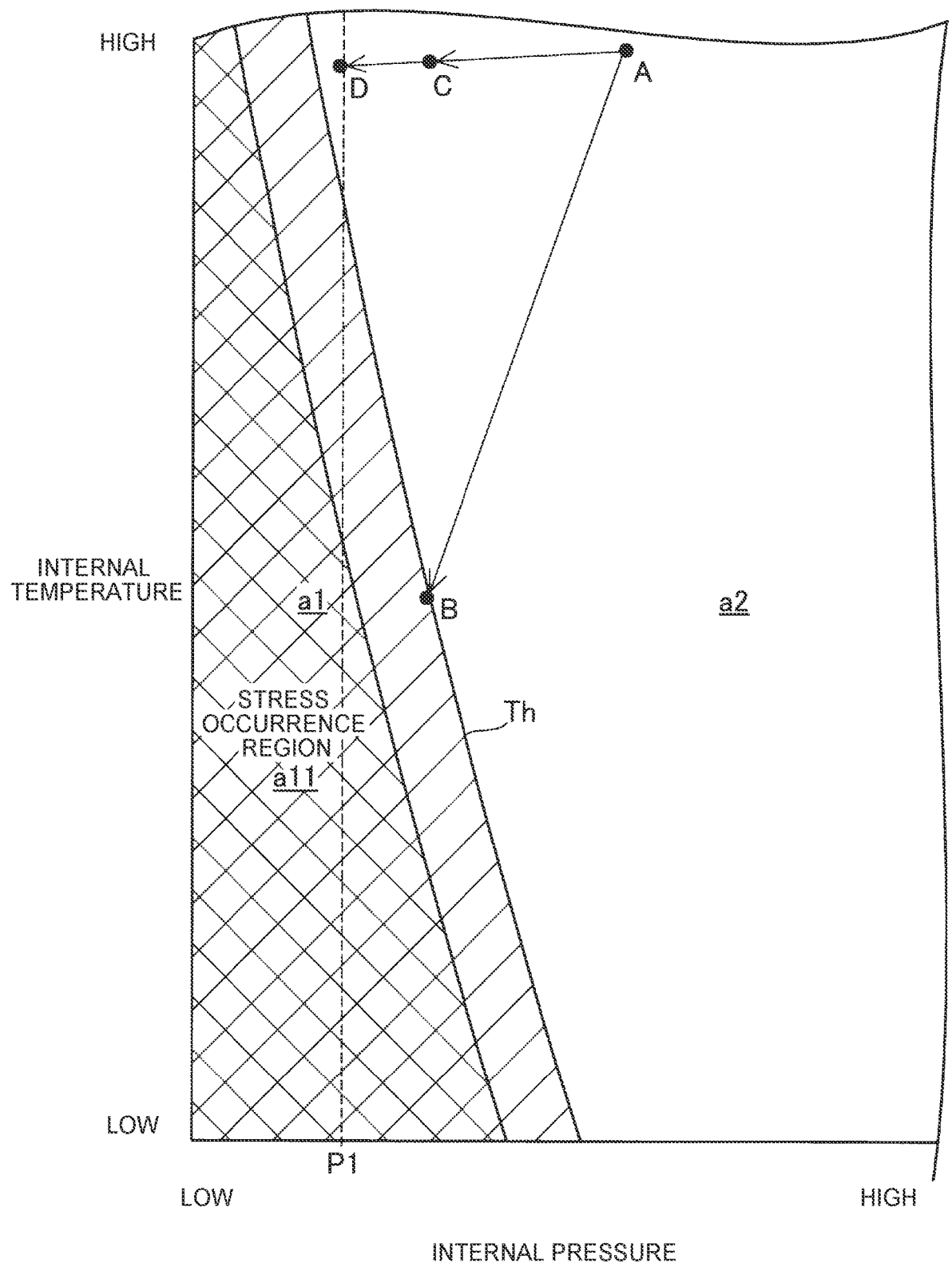
FIG. 3 is a graph illustrating a data map of an internal temperature and an internal pressure of a resin liner in the first embodiment.

FIG. 3 is a graph illustrating a data map of the internal temperature and the internal pressure of the resin liner 210 in the first embodiment. In FIG. 3, a first region a1 and a second region a2 are illustrated. The first region a1 is a region indicating that a stress caused in the resin liner 210 due to contraction of the resin liner 210 might damage the resin liner 210. In FIG. 3, the first region a1 is a region illustrated with single hatching and cross hatching. The second region a2 is a region having a higher temperature and a higher pressure than the first region a1. The first region a1 and the second region a2 are sectioned from each other by a boundary line Th.

A region illustrated with cross hatching in the first region a1 is a stress occurrence region a11. The stress occurrence region a11 is a region where a stress caused in the resin liner 210 due to a difference in contraction amount between the resin liner 210 and the reinforcing layer 220, the difference being caused due to changes in the internal temperature and the internal pressure, becomes a stress that damages the resin liner 210. In the present embodiment, the stress occurrence region a11 is determined based on a result of simulation of a relationship of the gap formed between the resin liner 210 and the reinforcing layer 220 with the stress caused in the resin liner 210 at the time of filling the fuel gas. Further, the boundary line Th is defined by a combination of a predetermined reference internal temperature and a predetermined reference internal pressure before the stress caused in the resin liner 210 becomes a stress that damages the resin liner 210. The combination is determined by adding a safety ratio to the stress occurrence region a11. In the following description, the combination of the reference internal temperature and the reference internal pressure that defines the boundary line Th is also referred to as a reference condition. Note that a region illustrated with single hatching in the first region a1 is a region in which the safety ratio is taken into consideration.

Here, the size of the gap formed between the resin liner 210 and the reinforcing layer 220 is calculated in accordance with contraction or expansion of the resin liner 210 due to a change in the internal temperature and contraction or expansion of the resin liner 210 due to a change in the internal pressure. The contraction or expansion of the resin liner 210 due to the change in the internal temperature is calculated by use of the length L of the resin liner 210 in the longitudinal direction, the diameter R of the resin liner 210, the linear expansion coefficient, and the internal temperature. The contraction or expansion of the resin liner 210 due to the change in the internal pressure is calculated by use of the length L of the resin liner 210 in the longitudinal direction, the diameter R of the resin liner 210, a wall thickness of the resin liner 210, a Young's modulus, a Poisson's ratio, and a tensile stress caused due to the internal pressure. Note that the Young's modulus changes in accordance with the temperature (internal temperature) of the resin liner 210. For example, when the temperature decreases, the Young's modulus increases. Further, for example, when the temperature increases, the Young's modulus decreases. Further, the simulation also takes into consideration a change amount of the size of the gap when a positional relationship between the resin liner 210 and the reinforcing layer 220 is changed due to the expansion or contraction of the resin liner 210. In the present embodiment, the data map including the stress occurrence region a11 and the boundary line Th is stored in the storage portion 82 (FIG. 1). Note that, a predetermined threshold P1 (described later) is illustrated in FIG. 3, but in the present embodiment, the threshold P1 is stored in the storage portion 82 separately from the data map. The threshold P1 is a threshold of the internal pressure.

Figure 4:
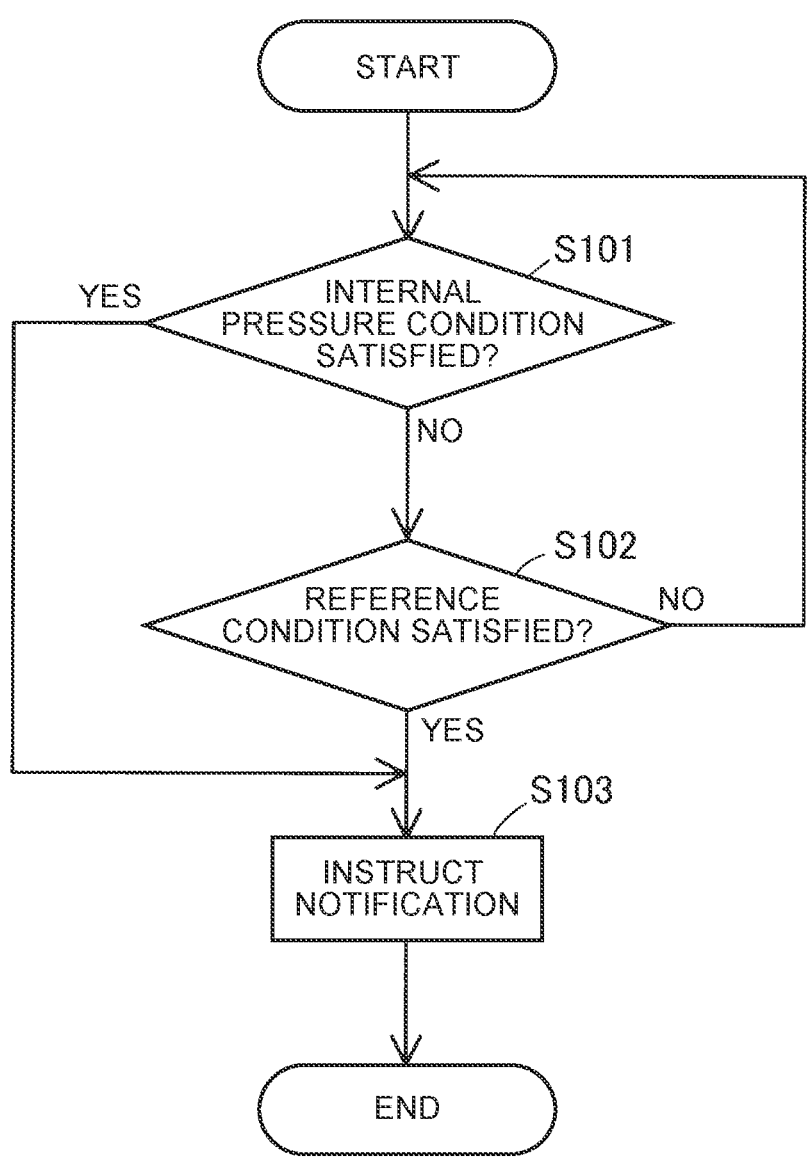
FIG. 4 is a flowchart illustrating the procedure at the time when notification is executed in the fuel cell system according to the first embodiment.

FIG. 4 is a flowchart illustrating a notification control executed by the fuel cell system 100 according to the first embodiment. The notification control is started when a power supply of the fuel cell system 100 is turned on. That the power supply of the fuel cell system 100 is turned on corresponds to, for example, a case where a start switch is pressed by the occupant of the fuel cell vehicle equipped with the fuel cell system 100 so that power generation by the fuel cell stack 20 is started. Here, the start switch is a switch configured to switch the fuel cell system 100 between start-up and stop.

When the notification control is started, the controlling portion 80 determines whether an internal pressure condition that respective value of the internal pressures of the high-pressure tanks 202, 204 reaches the predetermined threshold P1 (FIG. 3) is satisfied or not (step S101). In the present embodiment, the internal pressure condition is a value at which a cruising distance based on a total fuel-gas residual amount of the two high-pressure tanks 202, 204 is not more than a predetermined distance (e.g., 3 km), and an example of the value is 0.8 MPa. Pressure values measured by the pressure sensors 91, 92 (FIG. 1) are used as the internal pressures of the high-pressure tanks 202, 204. In step S101, when the internal pressures of the two high-pressure tanks 202, 204 are both less than the threshold P1, it is determined that the internal pressure condition is satisfied (step S101; Yes).

When the internal pressure condition is not satisfied (step S101; No), the controlling portion 80 then determines whether the reference condition that values of the internal pressures and values of the internal temperatures of the high-pressure tanks 202, 204 reach the boundary line Th (FIG. 3) is satisfied or not (step S102). In step S102, when the value of the internal pressure and the value of the internal temperature of at least either one of the high-pressure tanks 202, 204 reach the boundary line Th, it is determined that the internal pressures and the internal temperatures of the high-pressure tanks 202, 204 satisfy the reference condition (step S102: Yes). Temperatures measured by the temperature sensors 93, 94 are used as the internal temperatures of the high-pressure tanks 202, 204. When the internal pressures and the internal temperatures of the high-pressure tanks 202, 204 do not satisfy the reference condition (step S102: No), the controlling portion 80 determines again whether or not respective hydrogen residual amounts in the high-pressure tanks 202, 204 are less than the predetermined threshold P1 (step S101).

When the internal pressures and the internal temperatures of the high-pressure tanks 202, 204 satisfy the reference condition (step S102: Yes), the controlling portion 80 instructs the notification portion 84 to execute notification (step S103). Here, the case where the internal pressures and the internal temperatures satisfy the reference condition can correspond to, for example, a case where the vehicle continuously runs at an internal temperature of −40° C. or less, so that the internal pressures decrease due to consumption of the gases in the high-pressure tanks 202, 204 and the internal temperatures further decrease due to adiabatic expansion. The notification may be executed to notify, for example, that either one of the high-pressure tank 202 and the high-pressure tank 204 that satisfies the reference condition needs to be filled with the fuel gas. Further, even in a case where only one of the high-pressure tank 202 and the high-pressure tank 204 satisfies the reference condition, the notification may be executed to notify that the high-pressure tank 202 and the high-pressure tank 204 both need to be filled with the fuel gas. The notification control is finished when the notification is executed. Note that the notification by the notification portion 84 may continue until the fuel gas is filled into the high-pressure tanks 202, 204 or may be finished after a given period of time has passed.

In the meantime, in step S101, when the internal pressure condition that the internal pressures of the high-pressure tanks 202, 204 reach the predetermined threshold P1 is satisfied (step S101; Yes), the controlling portion 80 instructs the notification portion 84 to execute the notification without referring to the data map (step S103). That is, in this case, the controlling portion 80 causes the notification portion 84 to execute the notification regardless of whether or not the internal temperatures and the internal pressures of the high-pressure tanks 202, 204 satisfy the reference condition.

For example, at a combination point A illustrated in FIG. 3, the internal pressure of the high-pressure tank 200 is the threshold P1 or more (step S101: No), and the internal pressure and the internal temperature of the high-pressure tank 200 do not satisfy the reference condition (step S102: No). On this account, at the combination point A, the controlling portion 80 determines that the high-pressure tank 200 does not need to be filled with the fuel gas, so the controlling portion 80 does not instruct the notification portion 84 to execute the notification.

Further, in a case where the fuel gas starts to be consumed from the combination point A illustrated in FIG. 3, when the fuel gas is rapidly consumed, the fuel gas in the high-pressure tank 200 adiabatically expands along with the consumption of the fuel gas and the internal temperature largely decreases, so that the combination point A may be shifted to a combination point B. In this case, the internal pressure of the high-pressure tank 200 is the threshold P1 or more (step S101: No), but the internal pressure and the internal temperature of the high-pressure tank 200 satisfy the reference condition (step S102: Yes). On this account, at the combination point B, the controlling portion 80 determines that the high-pressure tank 200 needs to be filled with the fuel gas, so the controlling portion 80 instructs the notification portion 84 to execute the notification (step S103).

In the meantime, in a case where the fuel gas is consumed from the combination point A illustrated in FIG. 3, when the fuel gas is consumed slowly, the high-pressure tank 200 is warmed by an outside temperature, for example, so that the decrease of the internal temperature of the high-pressure tank 200 is reduced, thereby resulting in that the combination point A may be shifted to a combination point C. In this case, the internal pressure of the high-pressure tank 200 has the same value as the internal pressure at the combination point B, but since the internal temperature is high, the internal pressure and the internal temperature of the high-pressure tank 200 do not satisfy the reference condition (step S102: No). On this account, at the combination point C, the controlling portion 80 does not instruct the notification portion 84 to execute the notification. Further, in a case where the fuel gas is further consumed from the combination point C and the combination point C is shifted to a combination point D, the internal pressure of the high-pressure tank 200 is less than the threshold P1 (step S101: Yes), and therefore the controlling portion 80 instructs the notification portion 84 to execute the notification (step S103).

In the first embodiment described above, the controlling portion 80 determines whether the stress caused in the resin liner 210 due to the difference in contraction amount between the resin liner 210 and the reinforcing layer 220 satisfies the reference condition or not. The difference is caused due to changes in the internal temperature and the internal pressure. Here, the reference condition is that the internal temperature and the internal pressure of the resin liner 210 reach the boundary line Th indicative of a combination of a predetermined reference internal temperature and a predetermined reference internal pressure before the stress caused in the resin liner 210 becomes a stress that damages the resin liner 210. When the reference condition is satisfied, the controlling portion 80 determines that the high-pressure tank 200 needs to be filled with the fuel gas, and the controlling portion 80 causes the notification portion 84 to notify that the high-pressure tank 200 needs to be filled with the fuel gas. On this account, even in a case where there is a difference in contraction amount between the resin liner 210 and the reinforcing layer 220, the fuel cell system 100 can reduce the possibility that the resin liner 210 is damaged. Hereby, even under a low temperature environment in which a gap is easily formed between the resin liner 210 and the reinforcing layer 220, the fuel cell system 100 can reduce the possibility that the resin liner 210 is damaged. Accordingly, in comparison with a case where the notification control illustrated in FIG. 4 is not executed, the fuel cell system 100 can be used in a lower temperature environment. Further, even in a case where a shape where a gap is easily formed between the resin liner 210 and the reinforcing layer 220, e.g., an elongated shape with a small diameter is employed as the shape of the high-pressure tanks 202, 204, the possibility that the resin liner 210 is damaged can be reduced by the control at the time of use. Accordingly, a degree of freedom in selection of the shape of the high-pressure tanks 202, 204 improves.

Further, in the first embodiment described above, the controlling portion 80 determines whether the internal pressure condition that the internal pressure reaches the predetermined threshold P1 (FIG. 3) is satisfied or not. When the internal pressure condition is satisfied, the controlling portion 80 determines that the high-pressure tank 200 needs to be filled with the fuel gas, regardless of whether the reference condition is satisfied or not, and the controlling portion 80 causes the notification portion 84 to notify that the high-pressure tank 200 needs to be filled with the fuel gas. On this account, in the fuel cell system 100, it is possible to restrain such a situation that a residual amount of the fuel gas is largely decreased from a predetermined amount. Accordingly, it is possible to reduce the possibility that electric power cannot be generated by the fuel cell system 100 due to insufficiency of the fuel gas.

Further, in the first embodiment described above, the controlling portion 80 executes the notification control by use of both the internal temperature and the internal pressure. For example, in a case where the notification is executed when the internal temperature is a given value or less, the notification may be executed even at an internal pressure at which a stress that damages the resin liner 210 is not caused. Also, for example, in a case where the notification is executed when the internal pressure is a given value or less, the notification may be executed even at an internal temperature at which a stress that damages the resin liner 210 is not caused. In the meantime, in the fuel cell system 100, a combination of the internal temperature and the internal pressure at which a gap might be formed between the resin liner 210 and the reinforcing layer 220 can be set more minutely. Accordingly, it is possible to reduce the possibility that the notification is executed in a combination of the internal temperature and the internal pressure at which a stress that damages the resin liner 210 is not caused. Accordingly, in a fuel cell vehicle equipped with the fuel cell system 100, it is possible to improve a cruising distance in comparison with a case where the notification control is executed by use of only either one of the internal temperature and the internal pressure.

Further, in the first embodiment described above, the controlling portion 80 executes the notification control by use of the data map stored in the storage portion 82 in advance, so that a time required for processing in the notification control can be reduced.

B. Second Embodiment

Figure 5:
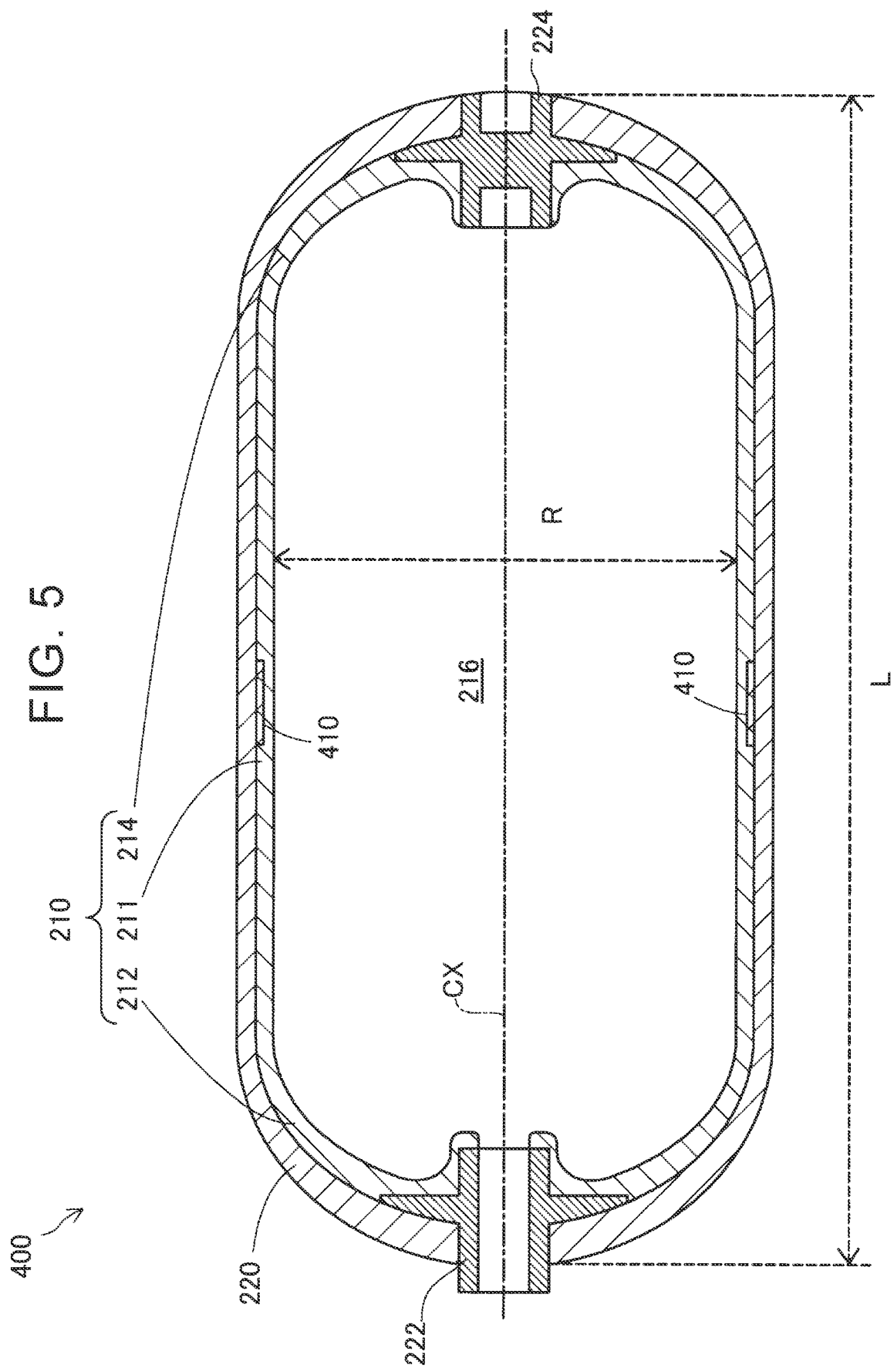
FIG. 5 is a schematic view of a high-pressure tank according to a second embodiment.

FIG. 5 is a schematic view of a high-pressure tank 400 according to the second embodiment. FIG. 5 illustrates a sectional structure obtained when the high-pressure tank 400 is cut along a central axis CX of the high-pressure tank 400. The high-pressure tank 400 used in the fuel cell system 100 of the second embodiment is different from the high-pressure tank 200 of the first embodiment in that a central part of the high-pressure tank 400 in its longitudinal direction is provided with a bonded part 410 where the resin liner 210 and the reinforcing layer 220 are bonded to each other over the circumferential direction of the resin liner 210. In the following description, the same constituent as that in the first embodiment has the same reference sign as in the first embodiment, and its detailed description is omitted.

The resin liner 210 and the reinforcing layer 220 at the bonded part 410 are bonded to each other, for example, such that a mold releasing agent is not applied to a region, of the resin liner 210, that becomes the bonded part 410 at the time of manufacturing the high-pressure tank 400. In this case, epoxy resin included in the reinforcing layer 220 functions as an adhesive that bonds the reinforcing layer 220 to the resin liner 210. Further, projections and recesses may be formed by performing a sanding process or the like on the region to become the bonded part 410, so as to increase a bonding area. In this case, stronger bonding is achieved in the bonded part 410.

Since the bonded part 410 is provided, even in a case where the resin liner 210 repeats contraction and expansion, the high-pressure tank 400 can restrain a change in the position of the resin liner 210 with respect to the reinforcing layer 220. This accordingly reduces a change amount of the size of a gap at the dome portion 212, 214 when the positional relationship between the resin liner 210 and the reinforcing layer 220 is changed due to expansion and contraction of the resin liner 210. Accordingly, a stress caused in the resin liner 210 can be easily calculated in comparison with a case where the position of the resin liner 210 might change with respect to the reinforcing layer 220.

Figure 6:
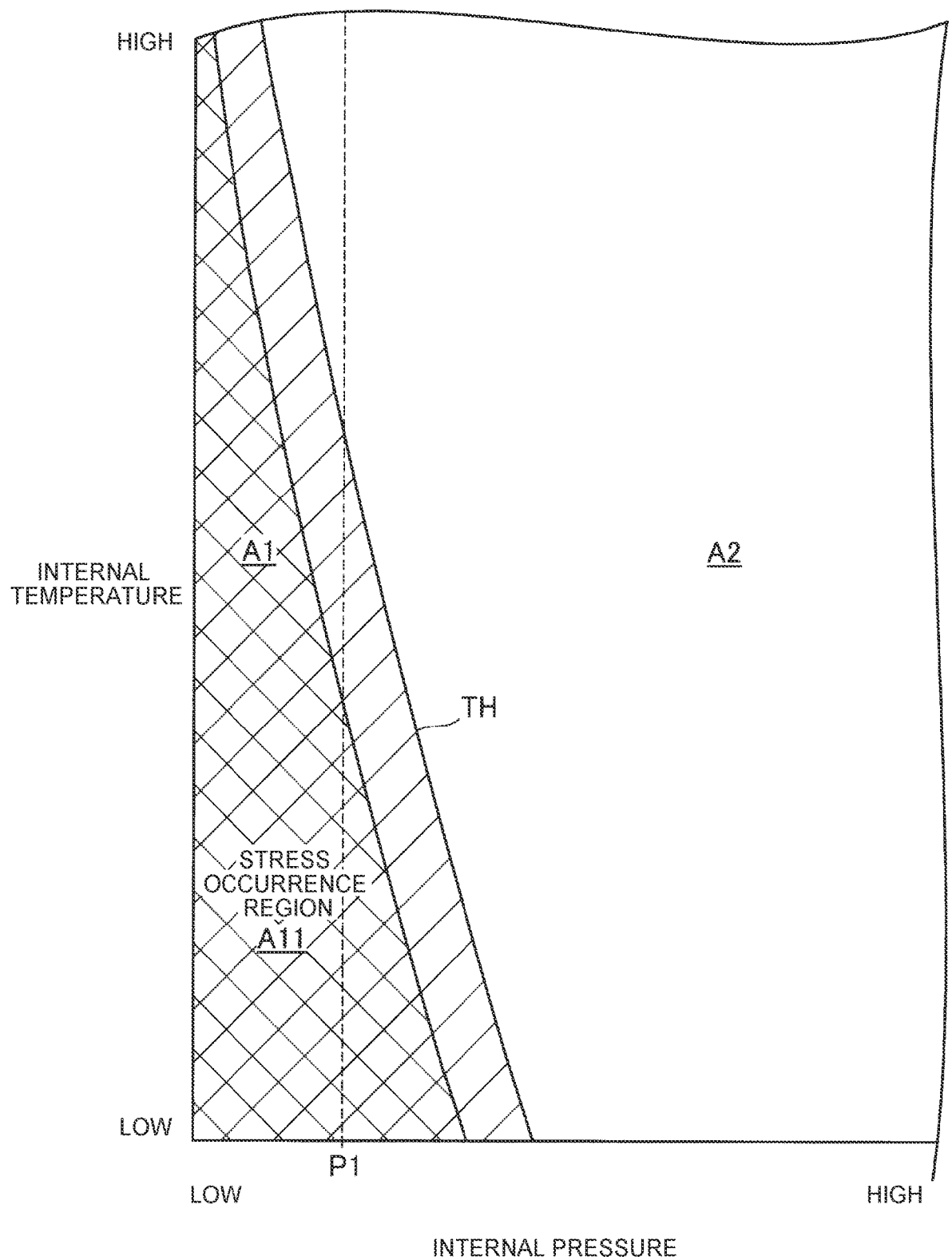
FIG. 6 is a graph illustrating a data map of an internal temperature and an internal pressure of a resin liner in the second embodiment.
Figure 7:
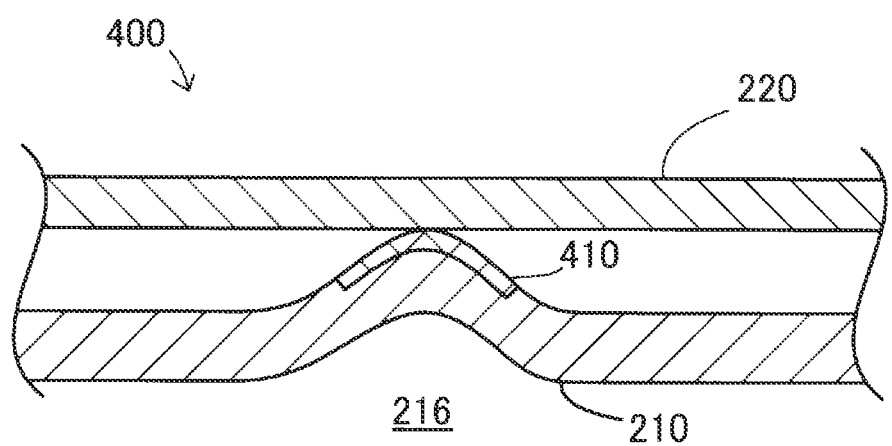
FIG. 7 is a schematic view to describe a state of a bonded part in a case where the internal temperature and the internal pressure of the resin liner fall within a stress occurrence region.

FIG. 6 is a graph illustrating a data map of the internal temperature and the internal pressure of the resin liner 210 in the second embodiment. FIG. 7 is a schematic view to describe a state of the bonded part 410 in a case where the internal temperature and the internal pressure of the resin liner 210 fall within a stress occurrence region A11. A data map in the present embodiment includes a first region A1, a second region A2, the stress occurrence region A11, and a boundary line TH that are defined by a condition different from the first embodiment. In the present embodiment, the first region A1 is a region indicating that a stress caused in the bonded part 410 due to contraction of the resin liner 210 might damage the resin liner 210. In FIG. 6, the first region A1 is a region illustrated with single hatching and cross hatching. The second region A2 is a region having a higher temperature and a higher pressure than the first region A1. A region illustrated with single hatching in the first region A1 is the stress occurrence region A11. The stress occurrence region A11 in the present embodiment indicates a combination of the internal temperature and the internal pressure at which a stress caused in the bonded part 410 due to a difference in contraction amount between the resin liner 210 and the reinforcing layer 220 becomes a stress that damages the resin liner 210. The difference is caused due to changes in the internal temperature and the internal pressure. In the present embodiment, the stress occurrence region A11 is determined based on a result of simulation of the stress caused in the bonded part 410 at the time when the resin liner 210 contracts.

In the present embodiment, when the resin liner 210 contracts in the radial direction, a stress corresponding to a contractive force is caused due to the bonded part 410 being bonded to the reinforcing layer 220. When the contraction of the resin liner 210 in the radial direction is large, a part of the bonding between the bonded part 410 and the reinforcing layer 220 is peeled off, so that a bonding area between the bonded part 410 and the reinforcing layer 220 decreases as illustrated in FIG. 7. In this case, a stress is concentrated on a region bonded to the reinforcing layer 220 in the bonded part 410 of the resin liner 210, thereby resulting in that a stress caused in the bonded part 410 might become a stress that damages the resin liner 210. Note that, as the diameter R of the high-pressure tank 400 is smaller, a gap tends to be easily formed between the resin liner 210 and the reinforcing layer 220 due to contraction in the radial direction.

The boundary line TH sectioning the first region A1 and the second region A2 from each other, as illustrated in FIG. 6, is defined by a combination of a predetermined reference internal temperature and a predetermined reference internal pressure before the stress caused in the bonded part 410 becomes the stress that damages the resin liner 210. The boundary line TH may be determined by adding a safety ratio to the stress occurrence region A11, for example. Also, for example, the boundary line TH may be a combination of the internal temperature and the internal pressure at which contraction or expansion of the resin liner 210 due to a change in the internal temperature is balanced with contraction or expansion of the resin liner 210 due to a change in the internal pressure. In this case, in the combination of the internal temperature and the internal pressure on the boundary line TH, a gap is not formed between the resin liner 210 and the reinforcing layer 220 and a pressure caused due to expansion of the resin liner 210 is not applied to the reinforcing layer 220. When the combination of the internal temperature and the internal pressure approaches the stress occurrence region A11 across the boundary line TH, a gap starts to be formed between the resin liner 210 and the reinforcing layer 220.

The second embodiment described above has a configuration similar to the first embodiment, thereby yielding an effect similar to the first embodiment. Further, in the second embodiment, in the notification control (FIG. 4), when the internal temperature and the internal pressure fall within the first region A1 indicative of a combination in which a stress concentration to the bonded part 410 might occur (step S102: Yes), the controlling portion 80 executes the notification (step S103). On this account, the fuel cell system 100 can execute the notification before the stress caused in the bonded part 410 becomes the stress that damages the resin liner 210. This restrains a breakage of the resin liner 210, particularly, a part near the bonded part 410, by a stress applied to the bonded part 410.

C. Other Embodiments

C1. First One of Other Embodiments

In the above embodiment, the fuel cell system 100 includes two high-pressure tanks 202, 204, but the fuel cell system 100 is not limited to this. For example, the fuel cell system 100 may include one high-pressure tank or may include three or more high-pressure tanks. In a case where the fuel cell system 100 includes three or more high-pressure tanks, when the internal pressures of all the high-pressure tanks provided in the fuel cell system 100 are less than the threshold P1, it is determined that the internal pressure condition is satisfied (step S101: Yes) in step S101 in the notification control (FIG. 4). Further, in step S102, when the internal pressure and the internal temperature of at least one of the high-pressure tanks provided in the fuel cell system 100 reach the boundary line Th, it is determined that the internal pressures and the internal temperatures of the high-pressure tanks satisfy the reference condition (step S102: Yes).

C2. Second One of Other Embodiments

In the above embodiments, the fuel gases in the two high-pressure tanks 202, 204 are adjusted to be consumed so that the internal pressures of the high-pressure tanks 202, 204 become the same. However, the consumption of the fuel gases is not limited to this. For example, the fuel gas may be consumed from only one of the high-pressure tanks, and when the fuel-gas residual amount of the one of the high-pressure tanks becomes less than a given amount, the consumption of the fuel gas from the one of the high-pressure tanks may be stopped and the fuel gas may start to be consumed from the other one of the high-pressure tanks. In this case, in step S101 in the notification control (FIG. 4), when the internal pressure of the high-pressure tank from which the fuel gas is finally consumed is less than the threshold P1, it is determined that the internal pressure condition is satisfied (step S101; Yes). Further, in step S102, when the internal pressure and the internal temperature of the high-pressure tank from which the fuel gas is finally consumed reach the boundary line Th, it is determined that the internal pressures and the internal temperatures of the high-pressure tanks 202, 204 satisfy the reference condition (step S102: Yes).

C3. Third One of Other Embodiments

In the above embodiments, the controlling portion 80 executes the notification control by use of the data map stored in the storage portion 82 in advance. However, the controlling portion 80 is not limited to this. For example, combinations of a predetermined reference internal temperature and a predetermined reference internal pressure may be stored as a list in the storage portion 82, and the controlling portion 80 may determine whether or not the list thus stored includes a combination corresponding to the internal temperature and the internal pressure. In this case, when the internal temperature and the internal pressure correspond to any of the combinations in the list, the controlling portion 80 may determine that the reference condition is satisfied. Further, the data map may not be stored in the storage portion 82, for example. In this case, the controlling portion 80 may execute the notification control by use of a data map stored in a server provided outside the fuel cell system 100. A contraction amount of the resin liner 210 may be calculated by use of the internal temperature and the internal pressure, and when the contraction amount becomes a predetermined value or more, the notification may be executed. Further, the data map may include the threshold P1.

C4. Fourth One of Other Embodiments

In the above embodiments, the high-pressure tanks 202, 204 provided in the fuel cell system 100 may have different lengths L and different diameters R. In this case, at the time when the stress occurrence region is determined, it is preferable that a high-pressure tank, out of the high-pressure tanks 202, 204, in which a stress to the resin liner 210 is most easily caused be used as a reference. For example, in the case of the first embodiment, it is preferable to use, as the reference, a high-pressure tank in which a gap is easily formed between the resin liner 210 and the reinforcing layer 220. Also, for example, in the case of the second embodiment, it is preferable to use, as the reference, a high-pressure tank in which a stress concentration to the bonded part 410 is most easily caused, that is, a high-pressure tank having a smallest diameter R. In this case, in a case where the high-pressure tanks 202, 204 provided in the fuel cell system 100 have different lengths L and different diameters R, a degree of freedom in placement of the high-pressure tanks 202, 204 in the fuel cell vehicle equipped with the fuel cell system 100 improves, for example.

C5. Fifth One of Other Embodiments

In the above embodiments, the fuel cell system 100 includes the temperature sensors 93, 94 as internal temperature acquisition portions and the pressure sensors 91, 92 as internal pressure acquisition portions. However, the fuel cell system 100 is not limited to this. For example, the fuel cell system 100 may include, as the acquisition portion, the pressure sensors 91, 92, and a temperature estimating portion configured to estimate the internal temperature by use of the internal pressure. Also, for example, the fuel cell system 100 may include, as the acquisition portion, a pressure estimating portion configured to estimate the internal pressure by use of the internal temperature, and the temperature sensors 93, 94 configured to measure the internal temperatures. The estimate of the internal temperature by use of the internal pressure and the estimate of the internal pressure by use of the internal temperature can be performed by use of a gas equation, for example. In a case where the internal pressure or the internal temperature is estimated by use of the gas equation, even when the internal pressure or the internal space changes, the volume of the internal space 216 of the high-pressure tank 200 may be assumed as a constant volume. For example, the internal pressure or the internal temperature may be estimated by applying, to the gas equation, the volume of the internal space 216 of the high-pressure tank 200 under a predetermined condition (e.g., a normal condition). Further, in this case, the fuel cell system 100 may estimate a fuel-gas residual amount in the high-pressure tank 200 by use of a filling amount of the fuel gas and a consumed amount of the fuel gas and may use the residual fuel gas amount to estimate the internal pressure or the internal temperature.

C6. Sixth One of Other Embodiments

In the above embodiments, the temperature sensor 93, 94 is placed in the high-pressure tank 202, 204, and the pressure sensor 91, 92 is provided in the fuel gas supply passage 34. However, the temperature sensor 93, 94 and the pressure sensor 91, 92 are not limited to this. For example, the temperature sensor 93, 94 may be provided in the fuel gas supply passage 34, and the controlling portion 80 may acquire the internal temperature such that correction is performed on a temperature acquired by the temperature sensor 93, 94 so as to remove, from the temperature, a temperature change after the fuel gas is discharged from the high-pressure tank 202, 204. Also, the pressure sensor 91, 92 may be placed in the high-pressure tank 202, 204, for example.

C7. Seventh One of Other Embodiments

In the above embodiments, in a case where the internal pressures and the internal temperatures of the high-pressure tanks 202, 204 satisfy the reference condition, the fuel cell system 100 may execute a process of restricting a power generation amount, in addition to the notification by the notification portion 84. The process of restricting the power generation amount may be executed by restricting an amount of the fuel gas to be supplied to the fuel cell stack 20 to a predetermined amount or less, for example. In this case, the fuel cell system 100 can reduce a consumption speed of the fuel gas after the reference condition is satisfied. Hereby, the fuel cell system 100 can reduce the decrease of the internal pressure and the decrease of the internal temperature in the high-pressure tank 200 due to the consumption of the fuel gas. In a case where the process of restricting the power generation amount is executed, the controlling portion 80 may control the operation of each constituent (e.g., at least any one of the regulator 44, the injector 45, and the hydrogen pump 46) of the fuel gas supply/discharge mechanism 50 in addition to the operation of the notification portion 84. Note that, in a case where the internal pressures of the high-pressure tanks 202, 204 satisfy the internal pressure condition, the fuel cell system 100 may also execute the process of restricting the power generation amount.

The one to seventh ones of other embodiments have a configuration similar to the first embodiment and the second embodiment, thereby yielding an effect similar to the first embodiment and the second embodiment.

C8. Eighth One of Other Embodiments

In the second embodiment, the bonded part 410 is formed in the central part of the high-pressure tank 400 in the longitudinal direction. However, the bonded part 410 is not limited to this. For example, the resin liner 210 and the reinforcing layer 220 may be bonded to each other in other regions in addition to or instead of the central part in the longitudinal direction. Further, in the bonded part 410, the resin liner 210 and the reinforcing layer 220 are bonded to each other over the circumferential direction of the resin liner 210. However, the bonded part 410 is not limited to this. For example, in the bonded part 410, the resin liner 210 and the reinforcing layer 220 may be partially bonded to each other over the circumferential direction of the resin liner 210.

This disclosure is not limited to the above embodiments and is achievable with various configurations within a range that does not deviate from the gist of the disclosure. For example, the technical features of the embodiments corresponding to the technical features of the aspects described in SUMMARY can be replaced or combined appropriately, in order to resolve some or all of the problems described above or in order to achieve some or all of the above effects. Further, the technical features can be deleted appropriately if the technical features have not been described as essential in the present specification.

What is claimed is:

1. A fuel cell system comprising:
    a fuel cell stack configured to generate electric power by consuming a fuel gas;
    a high-pressure tank including a resin liner and a reinforcing layer configured to cover an outer surface of the resin liner, the high-pressure tank being filled with the fuel gas;
    an acquisition portion configured to acquire a value of an internal pressure of the high-pressure tank and a value of an internal temperature that is a temperature inside the high-pressure tank;
    a notification portion configured to notify that the high-pressure tank needs to be filled with the fuel gas; and
    a controlling portion configured to control an operation of the notification portion by use of the value of the internal temperature and the value of the internal pressure, wherein:
    the controlling portion sets, in a map of the internal temperature and the internal pressure, a boundary line sectioning the map into a first region and a second region, the first region indicating a possibility that a stress caused in the resin liner due to contraction of the resin liner damages the resin liner, the second region having a higher temperature and a higher pressure than the first region; and
    when the value of the internal temperature and the value of the internal pressure reach the boundary line, the controlling portion causes the notification portion to notify that the high-pressure tank needs to be filled with the fuel gas.

2. The fuel cell system according to claim 1, wherein, when the value of the internal pressure reaches a predetermined threshold, the controlling portion causes the notification portion to notify that the high-pressure tank needs to be filled with the fuel gas, regardless of whether the value of the internal temperature and the value of the internal pressure reach the boundary line or not.

3. The fuel cell system according to claim 1, wherein:
    the resin liner includes a bonded part provided in a central part of the resin liner in a longitudinal direction of the resin liner so as to be bonded to the reinforcing layer; and
    the stress is caused in the resin liner at the bonded part due to contraction of the resin liner.

4. The fuel cell system according to claim 1, wherein the acquisition portion includes any one of the following to:
    a pressure sensor configured to acquire the value of the internal pressure and a temperature sensor configured to acquire the value of the internal temperature;
    the pressure sensor configured to acquire the value of the internal pressure and a temperature estimating portion configured to estimate the value of the internal temperature by use of the value of the internal pressure; and
    the temperature sensor configured to acquire the value of the internal temperature and a pressure estimating portion configured to estimate the value of the internal pressure by use of the value of the internal temperature.

5. The fuel cell system according to claim 2, wherein:
    the high-pressure tank is constituted by a plurality of high-pressure tanks; and
    when the value of the internal temperature and the value of the internal pressure of at least one of the high-pressure tanks reach the boundary line, the controlling portion causes the notification portion to notify that the at least one of the high-pressure tanks needs to be filled with the fuel gas.

6. The fuel cell system according to claim 5, wherein, when respective value of the internal pressures of the high-pressure tanks reach the predetermined threshold, the controlling portion causes the notification portion to notify that the at least one of the high-pressure tanks needs to be filled with the fuel gas, regardless of whether the value of the internal temperature and the value of the internal pressure reach the boundary line or not.

7. The fuel cell system according to claim 5, wherein:
    the high-pressure tanks are connected to the fuel cell stack via a fuel gas supply passage;
    the fuel gas supply passage is provided with opening and closing valves; and
    the controlling portion controls the opening and closing valves at a time of power generation of the fuel cell stack such that the high-pressure tanks have the same internal pressure.

8. The fuel cell system according to claim 5, wherein:
    the high-pressure tanks are connected to the fuel cell stack via a fuel gas supply passage;
    the fuel gas supply passage is provided with opening and closing valves;
    at a time of power generation of the fuel cell stack, the controlling portion controls the opening and closing valves such that the internal pressure of a second high-pressure tank out of the high-pressure tanks does not decrease until the internal pressure of a first high-pressure tank out of the high-pressure tanks decreases to a predetermined pressure value; and
    when the value of the internal pressure and the value of the internal temperature of the second high-pressure tank reach the boundary line, the controlling portion causes the notification portion to notify that at least the second high-pressure tank needs to be filled with the fuel gas.

9. The fuel cell system according to claim 8, wherein, when the value of the internal pressure of the second high-pressure tank reaches the predetermined threshold, the controlling portion causes the notification portion to notify that at least the second high-pressure tank needs to be filled with the fuel gas, regardless of whether the value of the internal temperature and the value of the internal pressure reach the boundary line or not.

10. A control method for a fuel cell system, the control method comprising:
    acquiring a value of an internal pressure of a high-pressure tank and a value of an internal temperature that is a temperature inside the high-pressure tank, the high-pressure tank including a resin liner and a reinforcing layer configured to cover an outer surface of the resin liner, the high-pressure tank being filled with a fuel gas to be consumed for power generation by a fuel cell stack;
    setting, in a map of the internal temperature and the internal pressure, a boundary line sectioning the map into a first region and a second region, the first region indicating a possibility that a stress caused in the resin liner due to contraction of the resin liner damages the resin liner, the second region being a region having a higher temperature and a higher pressure than the first region; and
    causing a notification portion to notify that the high-pressure tank needs to be filled with the fuel gas, when the value of the internal temperature and the value of the internal pressure reach the boundary line.

* * * * *